United States Patent

Vigor et al.

[11] Patent Number: 5,658,370
[45] Date of Patent: Aug. 19, 1997

[54] PROCESS FOR THE SEPARATION OF NITROGEN FROM A GASEOUS MIXTURE BY ADSORPTION

[75] Inventors: Xavier Vigor, Paris; Pierre Petit, Buc; Serge Moreau, Velizy Villacoublay; Bernard Sardan, Plaisir, all of France

[73] Assignee: L'Air Liquide, Societe Anonyme Pour l'Etude et l'Exploitation des Procedes Georges Claude, Paris Cedex, France

[21] Appl. No.: 501,319

[22] Filed: Jul. 12, 1995

[30] Foreign Application Priority Data

Jul. 18, 1994 [FR] France .................... 94 08822

[51] Int. Cl.$^6$ .............. B01D 53/047; B01D 53/06
[52] U.S. Cl. ................. 95/96; 95/113; 95/130; 95/902
[58] Field of Search .............. 95/96–105, 107–113, 95/130, 902

[56] References Cited

U.S. PATENT DOCUMENTS

| Re. 35,099 | 11/1995 | Hill | 95/98 |
|---|---|---|---|
| 3,140,933 | 7/1964 | McKee | 95/130 |
| 4,612,022 | 9/1986 | Berry | 95/113 |
| 4,810,265 | 3/1989 | Lagree et al. | 95/130 X |
| 4,812,147 | 3/1989 | BeVier | 95/130 X |
| 4,859,217 | 8/1989 | Chao | 95/130 |
| 4,925,460 | 5/1990 | Coe et al. | 95/130 X |
| 5,074,892 | 12/1991 | Leavitt | 95/130 X |
| 5,133,784 | 7/1992 | Boudet et al. | 95/113 X |
| 5,152,813 | 10/1992 | Coe et al. | 95/130 X |
| 5,174,979 | 12/1992 | Chao | 423/715 |
| 5,203,887 | 4/1993 | Toussaint | 95/130 X |
| 5,258,058 | 11/1993 | Coe et al. | 95/130 X |
| 5,258,060 | 11/1993 | Gaffney et al. | 95/130 X |
| 5,266,102 | 11/1993 | Gaffney et al. | 95/130 X |
| 5,268,023 | 12/1993 | Kirner | 95/130 X |
| 5,464,467 | 11/1995 | Fitch et al. | 95/98 |

FOREIGN PATENT DOCUMENTS

| 0297542 | 1/1989 | European Pat. Off. . |
|---|---|---|
| 0461478 | 12/1991 | European Pat. Off. . |
| 0591919 | 4/1994 | European Pat. Off. . |
| WO93/20925 | 10/1993 | WIPO . |

*Primary Examiner*—Robert Spitzer
*Attorney, Agent, or Firm*—Young & Thompson

[57] ABSTRACT

PSA process for the separation of nitrogen from a gaseous mixture containing nitrogen by selective adsorption of nitrogen from the gaseous mixture in an adsorbent mass with cyclic pressure variations. At least one nitrogen adsorption phase is carried out at high pressure and at least one nitrogen desorption phase is carried out at low pressure. The adsorbent mass is arranged in a rotating adsorber and at least 50% of the adsorbent mass is constituted by a zeolite exchanged with lithium by more than 50%.

9 Claims, No Drawings

PROCESS FOR THE SEPARATION OF NITROGEN FROM A GASEOUS MIXTURE BY ADSORPTION

FIELD OF THE INVENTION

The present invention relates to a process for the separation of nitrogen from a gaseous mixture, such as air, by selective adsorption of nitrogen on an adsorbent mass, with cyclic pressure variations. More particularly, the invention relates to a process for the separation of nitrogen from a gaseous mixture by means of a rotating adsorber.

BACKGROUND OF THE INVENTION

The processes for separation by adsorption of a gas from a gaseous mixture containing it, by adsorption of this gas, are well known. These processes use a cyclic pressure variation and are generally designated as PSA processes (for "Pressure Swing Adsorption"). These processes are particularly used for separating nitrogen from air, for the recovery of other gases from air, principally oxygen. This type of cyclic processes, comprises two principal phases. A first phase consists in a selective adsorption of a gas of the gaseous mixture on an adsorbent mass and passage of the other gases through this mass. The adsorption phase is effected at a high pressure. The second phase consists in a desorption of the gas previously adsorbed. This phase is effected at a relatively lower pressure. When the low pressure is below atmospheric pressure, one generally then speaks of a VSA (for "Vacuum Swing Adsorption"). However, for facility, there will be designated hereafter as "PSA process" not only PSA processes properly so-called, but also VSA processes.

The phases of adsorption and desorption are repeated cyclically for the continuous treatment of a flow of gaseous mixture. Numerous variations of this process comprising additional phases, have been developed, and are well known to those skilled in the art. To this end, reference could be had for example to the patent applications EP-A-350.373; WO-A-91/12874; EP-A-108.005; FR-A-2.579.484; FR-A-2.612.083 and FR-A-2.624.759.

Conventionally, PSA processes are carried out by means of devices comprising different adsorbent masses arranged each in a plurality of vessels, with or without auxiliary capacity.

The adsorbents generally used consist in molecular sieves or zeolites of the type zeolite 13X, 5A and 10X or mordenites.

Other adsorbents have been described as being able to be used in a PSA process. Thus, U.S. Pat. No. 3,140,933 and European application EP-A-297.542 relate to the utilization of zeolites X, which is to say zeolites whose Si/Al ratio is comprised between 1 and 1.5, strongly exchanged with lithium. These zeolites permit improving the selectivity of adsorption of the nitrogen contained in a gaseous mixture, such as air. Zeolites exchanged with lithium have however the large drawback of being of high cost. This cost could be up to four times that of a conventional zeolite. Because of this, the use of these zeolites in a conventional PSA device increases considerably the capital cost.

In this regard, reference can for example be had to U.S. Pat. No. 5,268,023, which states in effect that the zeolites exchanged with lithium with an exchange rate higher than 88% have too high a cost of production. This cost is principally connected to the large quantities of lithium salts necessary for their preparation, these lithium salts themselves being very expensive. This patent thus proposes the use of zeolites X exchanged with lithium at rates comprised between 70 and 88%, these zeolites having an Si/Al ratio around 1. However, the preparation of such zeolites requires substantially the same quantity of lithium salts as that necessary to prepare zeolites according to for example European application EP-A-297.542. Thus, the lithium ions are associated with tetrahedric $AlO_2$ units which are constituents of the zeolite. However, the smaller is the Si/Al ratio, the larger is the quantity of tetrahedric $AlO_2$ units in the zeolite. Because of this, the quantity of salts required to achieve a given exchange rate is higher, the lower is the Si/Al ratio.

So as to make the cost of zeolites exchanged with lithium acceptable, it has also been proposed in European application EP-A-461.478 to use them in a particular PSA process, for the separation of nitrogen from air, and recovery of the oxygen. According to this process, the ratio between the high pressure and the low pressure of the cycle must be comprised between 1.4:1 and 4:1. Thus, it is possible to decrease the energy consumption required to effect the adsorption phases. The energy saving thus effected is considered to compensate the cost of the zeolites exchanged with lithium.

However, this process requires the use of a mass of adsorbent which can be up to two times greater than that required in a PSA process in which the ratios of the high and low pressures are outside the range contemplated by EP-A-461.478.

The adsorbent mass being constituted of zeolites exchanged with lithium, it will be understood that the overall capital cost of the PSA device for practicing this process is very high and that it can be compensated by the saving in energy only after a very long time of operation.

Moreover, the range of pressure ratios from 1.4:1 to 4:1 cannot be used directly in a conventional PSA device, in which the compression pumps particularly are adapted to pressure ratios located outside this range. It is thus necessary to modify the compression pumps of a conventional PSA device for practicing the process according to EP-A-461.478.

It appears that the practice of a PSA process with zeolites exchanged with lithium has not yet been able to be carried out without substantially raising the overall capital cost of the PSA device.

French patent applications 90.12538 and 92.04487 in the name of the applicant, which correspond to U.S. Pat. Nos. 5,133,784 and 5,441,559, describe new PSA processes and devices according to which the adsorbent mass is not arranged in vessels but in a rotating adsorber. Within the scope of the present invention, by "rotating adsorber" is meant a rotating device comprising at least one adsorbent material arranged in a plurality of separated masses about and secured to a rotatable support shaft about a vertical axis.

For the separation of gases from a mixture of gas by means of a rotating adsorber, the gaseous mixture is caused to circulate radially through the adsorbent mass which is rotating at a predetermined speed. Each time this mass effects a complete rotation, it is successively subjected to different phases of a PSA process as mentioned above.

Such rotating adsorbers as well as their use for the separation of gases from a gaseous mixture, are described in detail in the French patent applications cited above, whose disclosures are incorporated herein by reference in their entirety.

The adsorbents used to the present in this type of rotating adsorber are those used in conventional PSA processes.

These adsorbents are therefore essentially zeolites 5A, 13X and 10X or mordenites.

The rotating adsorbers have the known advantage of permitting an increase in the productivity relative to a conventional PSA device, the productivity being expressed in $Nm^3$ of gaseous product per hour and by $m^3$ of adsorbent ($Nm^3/h/m^3$); one $Nm^3$ being one $m^3$ of gas measured at 0° C. and at atmospheric pressure. But they have the drawback, however, of leading to a diminution of recovery (expressed in volume of gas produced relative to the volume of gaseous mixture treated).

SUMMARY OF THE INVENTION

A first object of the invention consists in a PSA process which can be practiced by means of zeolites exchanged with lithium without giving rise to inhibitory increase in overall capital cost.

A second object of the invention consists in the use of zeolites exchanged with lithium in a PSA process by means of a PSA device which it is not necessary to modify.

A third object of the invention consists in a PSA process permitting improved production and yield.

The present invention thus consists in a PSA process for the separation of nitrogen from a gaseous mixture containing nitrogen, by selective adsorption of the nitrogen of said gaseous mixture in an adsorbent mass, with cyclic pressure variations comprising at least one adsorption phase of the nitrogen carried out at high pressure and at least one desorption phase of the nitrogen carried out at low pressure, said process being characterized in that the adsorbent mass is arranged in a rotating adsorber and at least 50% of the adsorbent mass is constituted by a zeolite exchanged with lithium to the extent of more than 50%.

Other characteristics and advantages of the present invention will become apparent from the following description.

DETAILED DESCRIPTION OF THE INVENTION

The zeolites used in the framework of the present invention can be chabazites, mordenites, zeolites A, X or Y. Preferably, these zeolites are synthetic or natural faujasites whose molar ratio Si/Al is comprised between 1 and 10, preferably between 1 and 4. Preferably, the synthetic or natural faujasite consists of a zeolite X, namely a zeolite whose molar ratio Si/Al is comprised between 1 and 1.5, preferably between 1 and 1.25.

The degree of exchange of the zeolites with lithium used in the framework of the process of the invention is preferably greater than 70%, more preferably greater than 80%, and still more preferably higher than 85%. The degree of exchange can reach 100%. A most particularly preferred zeolite consists in a zeolite X whose Si/Al ratio is comprised between 1 and 1.25, the exchange rate with lithium of this zeolite being greater than 80% and preferably greater than 95%. The processes of production of these zeolites are, for example, described in U.S. Pat. Nos. 5,268,023 and 3,140,933 or in European patent application EP-A-297.542.

The process of the invention can also be practiced with zeolites exchanged with lithium according to an exchange rate comprised between 50 and 95% and also exchanged with divalent cations, the exchange rate of these divalent cations being adapted to be comprised between 5 and 50%. These divalent cations can be selected from the group consisting of calcium, magnesium, barium, strontium, cobalt, copper, chromium, iron, manganese, nickel, zinc and mixtures of these cations.

The preparation of zeolites exchanged both with lithium and at least one divalent cation is described in European patent application EP-A-591.919 and in U.S. Pat. No. 5,174,979.

The adsorbent mass is preferably constituted by more than 70% by weight, preferably more than 90% by weight of a zeolite exchanged at least by lithium, the remaining adsorbent mass being constituted by conventional adsorbents such as zeolites 5A, 13X and 10X or by mordenites. However, according to one particularly advantageous embodiment, the adsorbent mass is constituted 100% by zeolites exchanged with lithium.

The high pressure of the cycle used in the case of a process according to the invention is conventionally comprised between 90 and 300 KPa, preferably between 100 and 150 KPa. The low pressure of the cycle is ordinarily comprised between 10 and 70 KPa, preferably between 25 and 40 KPa.

The process according to the invention is particularly adapted for the separation of nitrogen from a gaseous mixture containing nitrogen and a gas less polar than nitrogen, essentially oxygen.

The following examples have for their object to illustrate the present invention.

Example 1 (Not According to the Invention)

There is used a zeolite 5A in a conventional PSA device, which is to say a device in which the adsorbent masses are arranged in a plurality of vessels. Zeolite 5A has a capacity for the adsorption of nitrogen at 1 bar of 12 $Ncm^3/g$ and an oxygen adsorption capacity at 1 bar of 4 $Ncm_3/g$.

The PSA cycle used is a three-stage cycle comprising an adsorption stage (production step) at 1.1 atmospheric, a stage of desorption (decompression step) which is countercurrent, to 0.25 bar and a recompression step by countercurrent oxygen.

The oxygen product is of 90% purity. The zeolite 5A permits under these circumstances a productivity of 15 $Nm^3/h/m^3$, and a yield of 50%.

Example 2 (Not According to the Invention)

Example 1 is repeated but by replacing zeolite 5A with a zeolite X exchanged with lithium to 95%, having the following characteristics:

molar ratio: Si/Al=1, oxygen/nitrogen selectivity=7, adsorption capacity of nitrogen at 1 bar=17 $Ncm^3/g$, oxygen adsorption capacity at 1 bar=2.5 $Ncm^3/g$.

Under these circumstances, the production is 18.5 $Nm^3/h/m^3$ and the yield is 61.5%.

The results of Examples 1 and 2 show that a zeolite exchanged with lithium permits, in a conventional PSA device, a productivity gain of 23%.

Part of the investment in the adsorption in such a conventional PSA device is 10 to 30% according to the size of the device and hence the adsorbent mass which it contains. Productivity gain is insufficient to compensate the cost of the zeolite X with lithium which is twice that of zeolite 5A in a conventional PSA device.

Example 3 (Not According to the Invention)

A rotating adsorber is used of the type of that described in French patent No. 90.12538.

The cycle used comprises an adsorption step carried out at a pressure of 1.2 bar and a decompression step carried out at 0.25 bar.

The adsorbent is constituted by a zeolite such as defined in Example 1.

This device, when it is used to prepare oxygen of 40% purity, permits obtaining a productivity of 130 $Nm^3/h/m^3$ and an oxygen yield of 45%.

Example 4 (According to the Invention)

Example 3 is repeated by replacing the zeolite 5A by a lithium zeolite according to Example 2. For the preparation of oxygen of 90% purity, there is obtained a productivity of 170 $Nm^3/h/m^3$ and a yield of 60%.

The results of Examples 3 and 4 show that a zeolite exchanged with lithium permits, in a rotating adsorber, a gain of production of 31%.

Such a in productivity gain is altogether unexpected relative to the results that could be foreseen from Examples 1 and 2, using a conventional PSA device. But moreover, the cost component of the adsorbent in a rotating adsorber is from 1 to 3%. The gain of productivity here largely compensates the additional cost of the zeolite exchanged with lithium.

We claim:

1. A process for separating nitrogen from air by pressure swing adsorption in successive cycles, each comprising a nitrogen adsorption phase at least partly carried out at a cycle high pressure ranging between 90 and 300 KPa, and a nitrogen desorption phase at least partly carried out at a cycle low pressure ranging between 10 and 70 KPa, said process comprising: providing a plurality of chambers each containing an adsorbent mass including at least 50% of at least one lithium zeolite having a molar ratio Si/Al of between 1 and 1.5, and a lithium exchange ranging from at least 50% and 95%; and moving said plurality of chambers about a circular path sequentially to at least adsorption and desorption stations along said circular path.

2. The process of claim 1, wherein said chambers are moved continuously along said circular path.

3. Process according to claim 1, wherein the zeolite is a faujasite.

4. Processing according to claim 1, wherein the zeolite is a zeolite X.

5. Process according to claim 1, wherein the zeolite is exchanged with lithium by more than 70%.

6. Process according to claim 1, wherein the zeolite is a zeolite X whose molar ratio Si/Al is comprised between 1 and 1.25, said zeolite being exchanged with lithium by more than 80%.

7. Processing according to claim 1, wherein the zeolite is further exchanged by a divalent cation selected from the group consisting of calcium, magnesium, barium, strontium, cobalt, copper, chromium, iron, manganese, nickel and zinc, the exchange rate of the divalent cation being comprised between 5 and 50%.

8. Process according to claim 1, wherein 100% of the mass of adsorbent is constituted by a zeolite exchanged with lithium.

9. Process according to claim 1, wherein the high pressure is comprised between 100 and 150 KPa, and the low pressure is comprised between 25 and 40 KPa.

* * * * *